United States Patent
Murdoch et al.

[11] Patent Number: 5,857,082
[45] Date of Patent: Jan. 5, 1999

[54] METHOD AND APPARATUS FOR QUICKLY TRANSFERRING DATA FROM A FIRST BUS TO A SECOND BUS

[75] Inventors: Robert N. Murdoch, Sacramento, Calif.; Bruce A. Young, LeMars, Iowa; Tony M. Tarango, Folsom; David J. Harriman, Sacramento, both of Calif.

[73] Assignee: Intel Corporation, Santa Clara, Calif.

[21] Appl. No.: 845,801

[22] Filed: Apr. 25, 1997

[51] Int. Cl.$^6$ .................................................. G06F 13/40
[52] U.S. Cl. ......................... 395/308; 395/293; 395/872
[58] Field of Search .................................. 395/280, 281, 395/290, 293–309, 200.38, 200.61, 200.62, 200.66, 872, 877, 728–732

[56] References Cited

U.S. PATENT DOCUMENTS

| | | | |
|---|---|---|---|
| 5,201,036 | 4/1993 | Yoshimatsu | 395/325 |
| 5,467,295 | 11/1995 | Young et al. | 395/200.05 |
| 5,533,204 | 7/1996 | Tipley | 395/288 |
| 5,555,383 | 9/1996 | Elazar et al. | 395/306 |
| 5,630,094 | 5/1997 | Hayek et al. | 395/473 |
| 5,649,161 | 7/1997 | Andrade et al. | 395/494 |
| 5,652,848 | 7/1997 | Bui et al. | 395/309 |
| 5,664,117 | 9/1997 | Shah et al. | 395/280 |
| 5,664,122 | 9/1997 | Rabe et al. | 395/308 |
| 5,682,554 | 10/1997 | Harrell | 395/877 |
| 5,734,850 | 3/1998 | Kenny et al. | 395/309 |
| 5,740,376 | 4/1998 | Carson et al. | 395/281 |
| 5,740,385 | 4/1998 | Hayek et al. | 395/308 |

*Primary Examiner*—Ayaz R. Sheikh
*Assistant Examiner*—Jigar Pancholi
*Attorney, Agent, or Firm*—David J. Kaplan

[57] ABSTRACT

A method and apparatus for transferring data from a first bus to a second bus. A bridge couples a first bus to a second bus. The bridge includes a buffer to store two data elements of a first packet transferred to the buffer from the first bus. The bridge also includes a controller that permits a first data element to be transferred from the buffer to the second bus. In addition, if at least a portion of a second packet has not been transferred to the bridge from the first bus, then the controller causes at least one wait state to be inserted on the second bus before transferring the second data element of the first packet from the buffer to the second bus.

18 Claims, 3 Drawing Sheets

METHOD AND APPARATUS FOR QUICKLY TRANSFERRING DATA FROM A FIRST BUS TO A SECOND BUS

FIELD OF THE INVENTION

The present invention relates to computer systems and more particularly to a bridge that couples a first bus to a second bus and that transfers data from the first bus to the second bus.

BACKGROUND OF THE INVENTION

Typical computer systems, such as desktop and notebook computers, contain a processor and numerous other integrated circuits. The processor, which is typically considered to be the "brains" of the computer system, needs to be in communication with the other integrated circuits (ICs) so that the processor can communicate information to and compute information received from the other ICs. Similarly, the ICs need to be in communication with one another so that they are able to work together more efficiently. The lines of communication that allow one IC to communicate with other ICs within a computer system are called buses.

A computer system may contain many different types of buses, each having its own protocol. When an IC coupled to a first bus is to communicate information with another IC coupled to a second bus, an intermediate IC, or group of ICs, is used to couple the first bus to the second bus, thereby allowing communication between ICs coupled to the first and second buses. This intermediate IC, or group of ICs, is called a bridge. One type of bus is called a peripheral component interconnect (PCI) bus and is described in the PCI Local Bus Specification. Revision 2.1 (1995). Another type of bus is called a memory bus. An IC that requests data from another IC is called a bus master, initiating agent, or just simply master.

A master, such as a graphics signal processor, coupled to a PCI bus, initiates a read operation by requesting data from another IC or group of ICs, such as main memory of the computer system coupled to a memory bus. A PCI to memory bus bridge is used to couple the PCI bus to the memory bus, thereby allowing communication between the master and memory. The requested data, along with additional data, is transferred from the memory to the memory bus, from the memory bus to the bridge, from the bridge to the PCI bus, and from the PCI bus to the master. Data can be sent as a burst of data phases during a single transaction via the PCI bus in response to a single request by the master.

The ability to burst data across the PCI bus in this manner is advantageous to increase the bandwidth of the bus. Bandwidth is data flux measured as the amount of data that is transferred across a bus in a fixed period of time (the period of time is typically measured in clock cycles). A data element is the amount of data that is sent during a single data phase, usually in a single clock cycle, and is typically equal to the width of the data bus portion of the bus (the number of bus signal lines that transfer data along the bus). For a PCI bus having a data bus that is 32 bits wide, a data element is 32 bits wide, or one Dword (4 bytes), and is transferred during a single data phase in a single clock cycle of the burst. A group of related data elements is called a packet. The relationship between data elements within a packet is typically the close proximity of address locations of the data within memory. For example, a cache line, or some portion thereof, represents a packet. A cache line that is 32 bytes long contains 8 data elements each 32 bits in length.

Once the memory transfers a first packet of data to the bridge via the memory bus, transferring the packet from the bridge to the master via the PCI bus is achieved by consecutively transferring data elements of the first packet from the bridge to the master during contiguous data phases (clocks) of a burst cycle in a single transaction. Transferring a second packet of data, however, from the memory to the master, may involve some latency (time delay, typically measured in clock cycles) between the last data element of the previous packet (the first packet) and the first data element of the subsequent packet (the second packet), even if the address location of the subsequent packet is consecutive to the previous packet within memory. The reason for the latency may be due to, for example, a delay in transferring the subsequent packet from the memory to the bridge via the memory bus because another IC, such as the processor, is busy using the memory bus to communicate with memory. Another reason for the latency may be due to the time it takes to snoop the cache in the processor to ensure that the data contained in the subsequent packet is valid (to ensure cache coherency).

According to PCI latency protocol rules, only eight clocks are allowed for "target subsequent latency" before the transaction must be terminated. This means that a data element must be sent, during a data phase, within eight clocks from the completion of sending the previous data element during the previous data phase, so the maximum latency limit for data transfers is seven clocks. Once seven clocks have elapsed since a first data element is sent from the bridge to the master, the bridge must either send another data element during the eighth clock, or else disconnect the transaction. The reason for setting a maximum latency limit for data transfers is to prevent a master from tying up a bus while waiting for the target (the bridge in this case) to provide requested data during which time other masters may be waiting to use the same bus to communicate information with a target.

If the latency involved in transferring the second packet (or at least the first data element thereof) from the memory to the bridge causes too many clocks to elapse on the PCI bus while the bridge waits for the second packet after transferring the last data element of the first packet to the master, then the transaction is terminated by disconnecting. Once disconnected, the bridge must purge its appropriate buffers and reset its state machine, and the master must re-arbitrate for bus ownership and again request the data. Each of these operations associated with the disconnect and re-initiating of a separate transaction takes time and reduces the PCI bus bandwidth by delaying the transfer of data to the master. If, instead, the second packet is provided from the memory to the bridge before eight PCI clocks elapse, then the bridge can send the data elements of the second packet to the master during the same transaction burst in which the data elements of the first packet were sent. Thus, the time delay overhead associated with disconnecting and re-initiating a separate transaction is eliminated, and the data transfer from the target to the master is completed in less time, thereby increasing bandwidth by reducing data element transfer latency.

One method of ensuring that the data elements of the first and second packets are transferred from the main memory to the master during a single burst transaction, without violating PCI latency rules, is to reduce the latency associated with transferring the second packet from the memory to the bridge via the memory bus. This is accomplished by dedicating the memory bus to this transfer, preventing other ICs, such as the processor, from accessing memory via the memory bus until the second packet is transferred. Unfortunately, this results in reduced performance of the computer system because the processor is forced to stall until it can access required data from memory. This stall can take a while, particularly if the processor must not only wait for the second packet to be transferred from the memory to the bridge but also wait for a third and fourth packet to be transferred as well during a long burst transaction.

SUMMARY OF THE INVENTION

A method and apparatus for transferring data from a first bus to a second bus is described. A bridge couples a first bus to a second bus. The bridge includes a buffer to store two data elements of a first packet transferred to the buffer from the first bus. The bridge also includes a controller that permits a first data element to be transferred from the buffer to the second bus. In addition, if at least a portion of a second packet has not been transferred to the bridge from the first bus, then the controller causes at least one wait state to be inserted on the second bus before transferring the second data element of the first packet from the buffer to the second bus.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
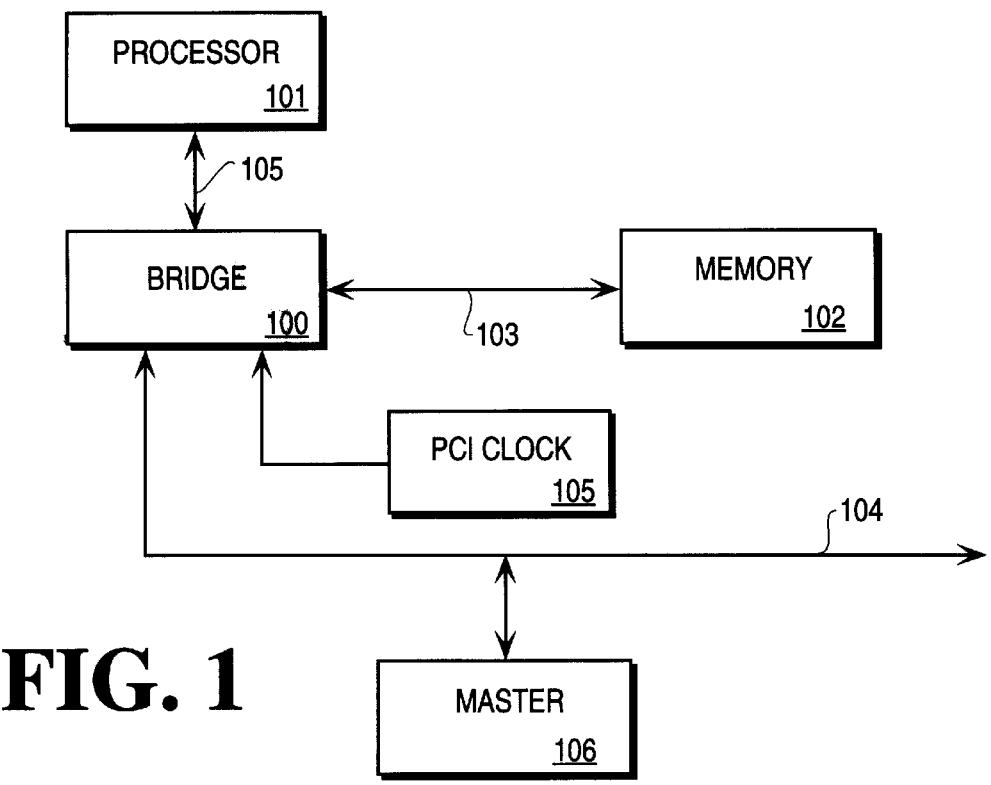
FIG. 1 is a computer system formed in accordance with an embodiment of the present invention.

A method and apparatus for quickly transferring data from a first bus to a second bus is described. The latency associated with the transfer is reduced by performing the transfer during a single transaction, across cache line boundaries, without violating bus latency rules for subsequent data transfers. This results in increased bandwidth.

First, a master initiates a read operation by requesting data stored in a memory location. The memory, coupled to a first bus, transfers a first packet of data containing the requested data to a bridge via the first bus. This first packet is stored in a buffer within the bridge. The bridge then transfers one or more data elements of the first packet from its buffer to the master via a second bus during a read burst transaction. A controller within the bridge determines whether or not a second packet has been transferred from the memory to the bridge.

If the second packet, or some portion thereof, has been transferred from the memory to the bridge, it is also stored in the buffer, and the remaining data elements of the first packet are transferred from the buffer to the master without delay. The bridge then begins to transfer data elements of the second packet from the buffer to the master during the same burst transaction in which the data elements of the first packet are transferred, while the controller determines whether or not a third packet has been transferred from the memory to the bridge.

If, instead, the controller determines that the second packet, or some portion thereof, has not been transferred from the memory to the bridge within a predetermined period of time, then the controller inserts one or more wait states on the second bus between transferring data elements of the first packet stored in the buffer. A wait state is a clock cycle during which time no data is transferred over the bus (i.e. no data phase). The number of wait states inserted on the bus is less than the maximum number of wait states defined by the maximum latency limit for data transfers allowed by the bus protocol of the second bus.

In this manner, a transaction of transferring a packet of data elements is delayed, or stretched out over time, thereby allowing the memory more time to transfer the next packet without violating the bus latency rules. This reduces the risk that the delay in transferring the subsequent packet from the memory to the bridge will result in terminating the transaction due to bus protocol latency limitations. Completing the data transfer of two or more packets within a single transaction reduces the large time delay associated with re-initiating a separate transaction to complete the data transfer, which may include interim arbitration events, arbitration cycles, and transactions initiated by other masters. Thus, computer system performance is improved by improving the speed in which data is transferred from one IC coupled to a first bus to another IC coupled to a second bus within the computer system. A more detailed description of the present invention, including various configurations and implementations in accordance with alternate embodiments of the present invention, is provided below.

FIG. 1 is a computer system formed in accordance with an embodiment of the present invention in which processor 101 is coupled to bridge 100 via host bus 105. Bridge 100 is coupled to memory 102 via memory bus 103. Bridge 100 is also coupled to master 106 via PCI bus 104, and a PCI clock 105 is coupled to bridge 100. Bridge 100 is also known as a host bridge or host/PCI bus bridge because it couples host bus 105 to PCI bus 104. Bridge 100 also couples host bus 105 to memory bus 103, and couples memory bus 103 to PCI bus 104. PCI clock 105 is a clock generator that provides a clock signal used to synchronize the transfer of data between ICs coupled to PCI bus 104, such as bridge 100 and master 106. For an alternate embodiment of the present invention, additional ICs are coupled to the PCI bus. Memory 102 is the system memory or main memory of the computer system comprising, for example, dynamic random access memory (DRAM) ICs or other type of storage devices. Alternatively, the memory is another type of memory of the computer system, such as, for example, a cache, a buffer within any other IC, or any peripheral storage medium (e.g. magnetic, optical, or solid state disk).

Master 106 requests data stored in memory 102. Memory 102 provides a first packet containing the requested data via memory bus 103 to bridge 100, where it is temporarily stored before being transferred to master 106 via PCI bus 104. After transfer of the first packet from the memory to the bridge is completed, the memory bus becomes available to other devices, such as, for example, processor 101, for accessing data in memory 102.

Figure 2:
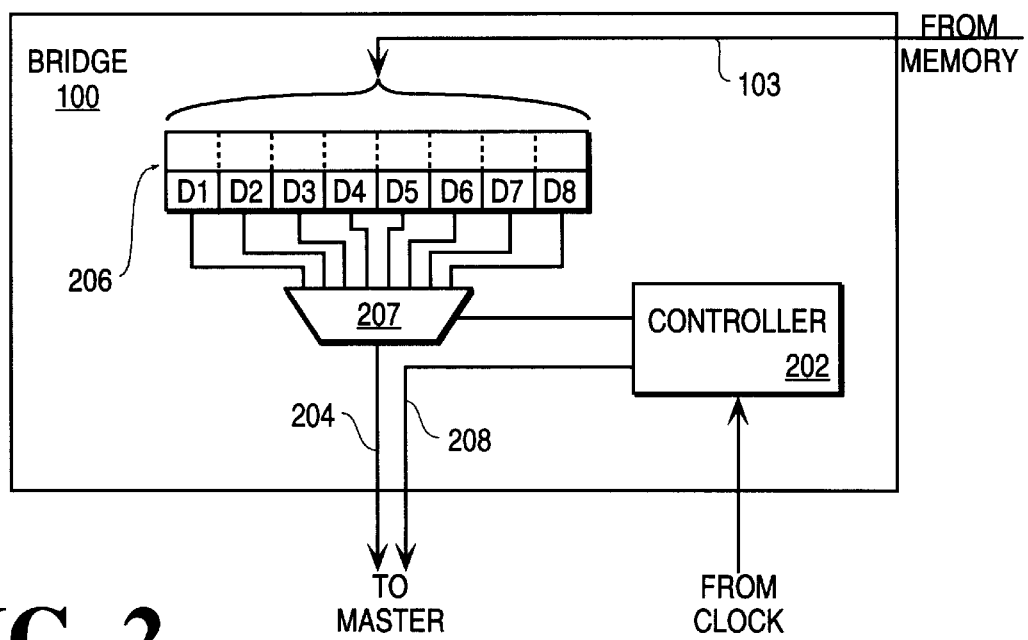
FIG. 2 is a bridge formed in accordance with an embodiment of the present invention.

FIG. 2 shows bridge 100 of FIG. 1 formed in accordance with an embodiment of the present invention. Memory bus 103 is coupled to memory buffer 206, comprising an upper and a lower memory register. The output of buffer 206 is coupled to the input of multiplexer 207. Controller 202 is coupled to the control input of multiplexer 207. The output of multiplexer 207 is coupled to the data bus 204 of a PCI bus. A clock is coupled to controller 202, and the controller is coupled to TRDY# signal line 208. TRDY# signal line 208 and data bus 204 represent a portion of PCI bus 104 of FIG. 1. (A full PCI bus includes additional signal lines which are not shown here to avoid obscuring the present invention.)

The first packet provided from memory 102 to bridge 100 via memory bus 103 is stored in buffer 206 within bridge 100. As shown, the first packet comprises eight data elements, D1–D8, stored in the lower register of buffer 206. For one embodiment, this first packet of data is a cache line 32 bytes long, and each data element is equal to the width of data bus 204 of PCI bus 104 which is one Dword (4 bytes) long. In accordance with an alternate embodiment, the packet comprises only a portion of a cache line, or represents two or more data elements associated in some other way. For another embodiment, the width of a data element within a data packet is equal to or less than the width of the data bus portion (the portion that carries data) of the bus. For example, using the 64-bit extension of the PCI bus, a data element is up to 64 bits (8 bytes) long. For an alternate embodiment, buses other than memory and PCI buses are implemented. Alternatively, the memory buffer within a bridge formed in accordance with the present invention is larger than buffer 206 of FIG. 2, or small enough to store only two data elements.

Once the first packet is loaded into buffer 206 in the bridge of FIG. 2, multiplexer 207, under the control of controller 202, selectively transfers one of data elements D1–D8 from buffer 206 to PCI data bus 204. Before controller 202 permits all of the data elements D1–D8 of the first packet to be transferred through multiplexer 207, however, controller 202 determines whether or not a second packet, or some portion thereof, has been transferred from memory 102 to bridge 100 via memory bus 103. If the second packet has been transferred, the packet is loaded into the upper register of buffer 206, and controller 202 permits any remaining data elements of the first packet to be transferred through multiplexer 207 to PCI data bus 204, and ultimately to master 106.

For one embodiment, controller 202 makes this determination by monitoring the validity bits of the upper register of buffer 206. Once the upper register is loaded, the validity bit is set to valid, and this signals the controller to continue transferring data elements of the first packet to master 106 via multiplexer 207 and PCI bus 104. For another embodiment, controller 202 makes this determination by monitoring a signal line of memory bus 103 that indicates a transfer of data elements of the second packet to bridge 100.

Once all of the eight data elements of the first packet have been transferred from buffer 206 of bridge 100 to master 106 via bus 104, controller 202 causes multiplexer 207 to begin transferring the data elements of the second packet from buffer 206 to master 106. In this manner, the second packet is treated like the first packet as described above, and the controller monitors the bridge to determine whether or not a third packet, or some portion thereof, has been transferred from memory 102 to bridge 100 via memory bus 103. For one embodiment of the present invention, this cycle of transferring data elements of one packet to a second bus while verifying that data elements of a subsequent packet have been received from a first bus continues until the burst transaction is completed.

If, on the other hand, the second packet has not been transferred from memory 102 to bridge 100 before all of the data elements of the first packet have been transferred from bridge 100 to master 106, the controller delays the transfer of subsequent data elements of the first packet from the bridge to the master. This causes master 106 to wait for a period of time before the controller permits another data element of the first packet to be transferred from buffer 206 through multiplexer 207 and on to master 106 via the data bus portion of PCI bus 104. During this waiting period, in accordance with one embodiment of the present invention, controller 202 inserts wait states (also called wait cycles) on PCI bus 104 by deasserting a TRDY# signal on TRDY# signal line 208 of PCI bus 104.

For one embodiment of the present invention, these wait states are not inserted on the bus until after the second-to-last data element of the first packet has been transferred. For an alternate embodiment, the wait states are inserted between any or all data elements of the first packet (or second or third packets, etc., depending on which packet is currently being transferred). In accordance with an embodiment in which a bus other than a PCI bus is implemented, the appropriate signal or signals are asserted or deasserted on the bus to cause the master to wait for a period of time before the controller permits another data element of the first packet to be transferred from bridge to the master.

Figure 3:
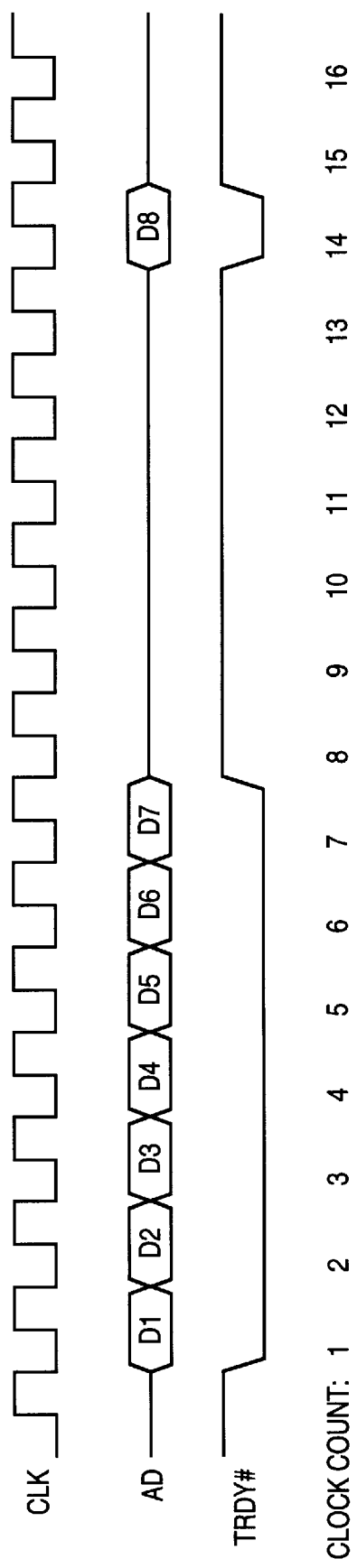
FIG. 3 is a timing diagram of one embodiment of the present invention.

FIG. 3 is a timing diagram of one embodiment of the present invention in which wait states are inserted between data elements D7 and D8 of the packet of FIG. 2 upon determining that a subsequent packet has not been transferred to bridge 100. The CLK signal is the PCI clock from PCI clock 105 of FIG. 1 to controller 202. Note that according to PCI bus protocol, data is transferred on the rising edge of the CLK signal during the data phase of a transaction in burst mode. The AD signal shows activity on data bus 204 of PCI bus 104. This signal is labeled AD because the address and data are multiplexed together on the same lines of the PCI bus. The TRDY# signal is applied to signal line 208 and stands for "Target Ready." This signal indicates the target's (the bridge in this case) ability to complete the current data phase of the transaction. During a read operation, the assertion of TRDY# (driving the signal low) indicates that valid data is present on the PCI bus. Deassertion of TRDY# (driving the signal high) indicates a wait state.

As shown in FIG. 3, during the first clock count data element D1 is transferred during a data phase from buffer 206 of bridge 100, through multiplexer 106, to master 106 via data bus 204 of PCI bus 104. Similarly, during the second through seventh clock counts, data elements D2–D7, respectively, are transferred during data phases from bridge 100 to master 106 via the PCI bus. After clock count 7, controller 202 within bridge 100 recognizes that the second packet of data elements has not yet arrived from the memory. As a result, at clock count 8 the controller deasserts TRDY#, thereby inserting a wait state on the PCI bus.

After clock count 8, the controller again determines that the second packet of data elements has not yet arrived from the memory. As a result, at clock count 9 the controller continues the deassertion of TRDY#, thereby inserting another wait state on the PCI bus. After clock count 9, the controller again determines that the second packet of data elements has not yet arrived from the memory. As a result, at clock count 10 the controller continues the deassertion of TRDY#, thereby inserting another wait state on the PCI bus.

The controller continues to monitor the arrival of the second packet of data elements and appropriately assert or deassert TRDY# in this manner until either a predetermined number of wait states have been inserted or the second packet arrives. Once a predetermined number of wait states have been inserted onto the bus, the next data element is either transferred from the bridge to the master, if there is a data element left to transfer, or the bridge disconnects connection to the master. This predetermined number of wait states is set to be less than the maximum number of wait states defined by the maximum latency limit for data transfers allowed by the bus protocol. In this manner, bus latency rules will not be violated.

For example, for the embodiment shown in FIG. 3, six wait states are inserted between transferring the D7 and D8 data elements of the first packet from bridge 100 to master 106. These six wait states are inserted during clock counts 8–13, inclusive, as shown. Note that a seventh wait state could also be inserted without violating PCI latency rules which require that a subsequent data phase be completed within eight clocks from the completion of the previous data phase. For an alternate embodiment of the present invention, any number of wait states, in compliance with the particular bus latency rules are inserted between the data transfers of any two or more data elements of a packet. In accordance with one embodiment of the present invention, the predetermined number of wait states is set by a clock counter implemented in the controller, and may be either hard-wired into the bridge or changeable via software.

Once the controller detects that at least a portion of the second data packet has been transferred from memory 102 to bridge 100, the remaining data elements of the first data packet are transferred and one or more data elements of the second data packet are then transferred in the same transaction. The controller then determines whether or not a third data packet has been transferred from the memory to the bridge. If the third packet has not been transferred, then the controller inserts wait states on the PCI bus between the transferring of data elements of the second packet from the bridge to the master. Once the controller detects that at least a portion of the third data packet has been transferred from the memory to the bridge the remaining data elements of the second data packet are transferred and one or more data elements of the third data packet are then transferred in the same transaction. The controller then determines whether or not a fourth data packet has been transferred from the memory to the bridge, and the cycle continues in this manner, transferring a previous packet while checking for the arrival of a subsequent packet, until the transaction ends.

In accordance with the embodiment of FIG. 3, inserting the six wait states between the D7 and D8 data elements allows the memory an additional period of time, equal to six PCI clock signals, in which to transfer the second packet to the bridge while the bridge stalls before transferring data element D8 to the master. Note that the memory still has the seven additional PCI clocks in which to transfer the second packet to the bridge after data element D8 is transferred from the bridge to the master.

For an alternate embodiment of the present invention, up to seven wait states are inserted, either in addition to the six wait states between data elements D7 and D8 or instead of these wait states, between data elements D6 and D7. Alternatively, up to the maximum allowable number of wait states, dictated by the bus protocol of the bus that couples the bridge to the master, are inserted between any two or more data elements of a packet, to cause the transfer of the packet from the bridge to the master to stall, thereby stretching out the transaction, while waiting for a subsequent packet to be transferred from the memory to the bridge.

Figure 4:
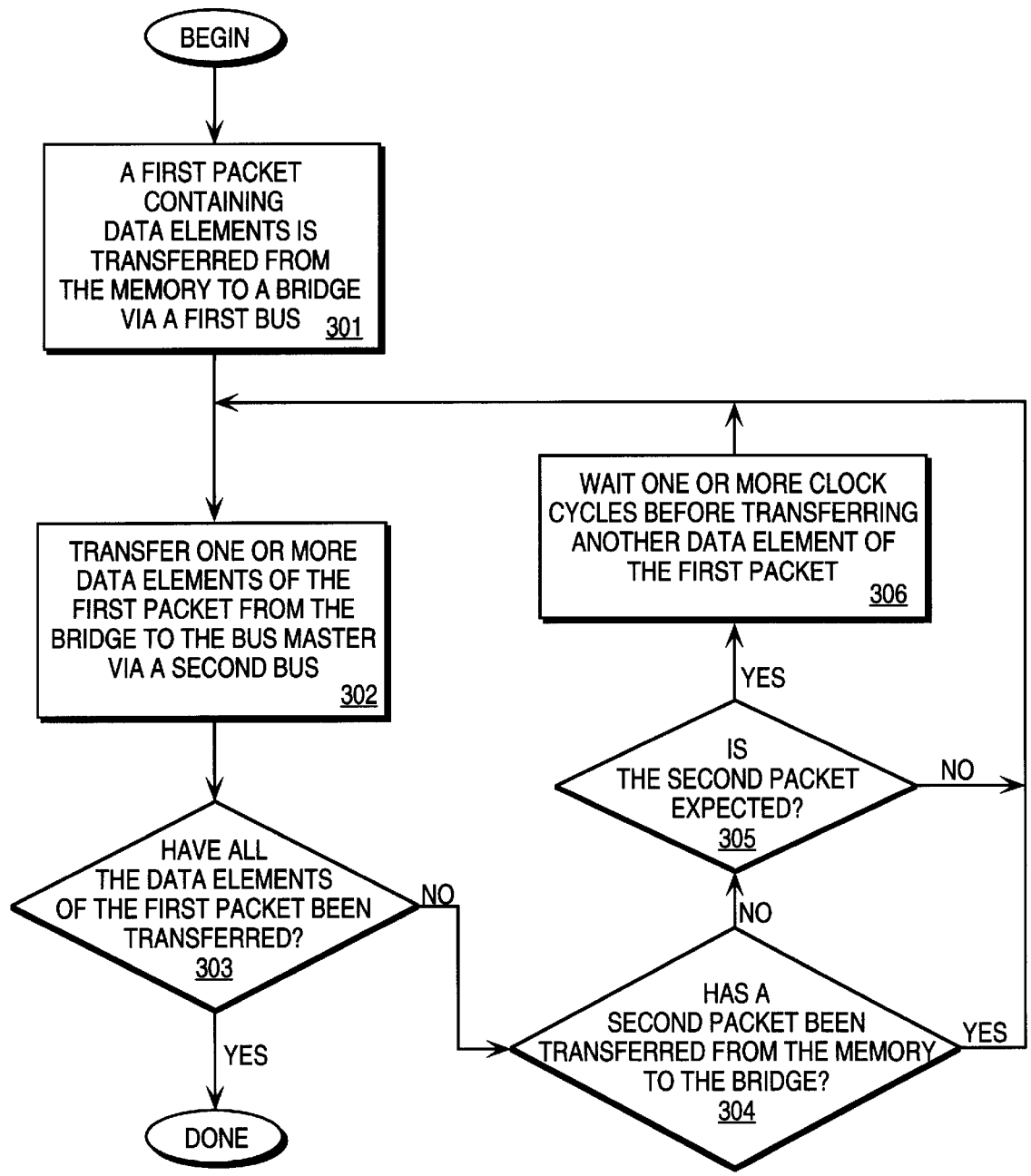
FIG. 4 is a flow chart showing a method of the present invention.

FIG. 4 is a flow chart showing a method of the present invention. At step 301 a first packet containing data elements is transferred from a memory to a bridge via a first bus. For one embodiment of the present invention, the first packet is the first, second, third, or any other packet of data elements transferred from the memory to the bridge following a request for data from a master.

At step 302 one or more data elements of the first packet are transferred from the bridge to a bus master via a second bus. For one embodiment of the present invention, during a first pass through step 302, for a first packet containing N data elements, N-1 data elements are transferred to the master before proceeding to step 303. At step 303 it is determined whether or not all the data elements of the first packet have been transferred. For one embodiment of the present invention, for a first pass through step 303 of the first packet, the answer to the question posed at step 303 is "No."

If it is determined at step 303 that not all of the data elements of the first packet have been transferred, then the flow proceeds to step 304 where it is further determined if a second packet has been transferred from the memory to the bridge. For one embodiment of the present invention, the second packet is the second, third, fourth or any other packet of data elements to be transferred from the memory to the bridge following the transferring of the first packet. If it is determined at step 303 that all of the data elements of the first packet have been transferred, then the process is done. For one embodiment of the present invention, once the process ends, either the transaction continues if the second packet is transferred to the bridge from the memory in time to avoid violating bus latency rules on the second bus, or the transaction ends.

If it is determined at step 304 that the second packet has been transferred from the memory to the bridge, in time to avoid ending the transaction during which the first packet is transferred from the bridge to the master, then the process is repeated beginning with step 302. For one embodiment of the present invention, the remainder of the data elements of the first packet are transferred from the bridge to the master without delay at step 302.

If, on the other hand, it is determined at step 304 that the second packet has not been transferred from the memory to the bridge, it is further determined if the second packet is expected from the memory to the bridge at step 305. If the second packet is not expected (i.e. is not expected within the maximum latency limit for data transfers allowed by the bus protocol of the second bus), then there is no need for the bridge to stall the transfer of the data elements of the first packet by inserting wait states as this would only serve to reduce the bus bandwidth. Therefore, if the second packet is not expected, the remainder of the data elements of the first packet are transferred from the bridge to the bus master at step 302.

For one embodiment of the present invention, the bridge detects when the first to second packet addresses crosses a page boundary in memory (e.g. every 4K for some embodiments). The latency associated with transferring the second packet across this boundary would result in a disconnect between the bridge and master for exceeding the maximum latency limit for data transfers on the second bus. Therefore, since the transaction would have ended anyway, the remaining data elements of the first packet are transferred from the bridge to the bus master without delay, and the master re-arbitrates for bus ownership to receive the second packet in a subsequent transaction.

If, on the other hand, it is determined at step 305 that the second packet is expected, the bridge waits for a period of time equal to one ore more clock cycles on the second bus at step 306 before transferring another data element of the first packet from the bridge to the master. For one embodiment of the present invention, step 306 is accomplished by the bridge inserting wait states on the second bus. The length of time waited at step 306, in accordance with one embodiment of the present invention, is less than the maximum latency limit for data transfers allowed by the bus protocol of the second bus. After step 306 is completed, one or more data elements of the first packet are transferred from the bridge to the master via the second bus at step 302, and the cycle repeats itself.

This invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A bridge to couple a first bus to a second bus, the bridge comprising:

a buffer to store first and second data elements of a first packet transferred to the buffer from the first bus; and a controller to permit the first data element to be transferred from the buffer to the second bus, and, if an initial portion of a second packet has not been transferred to the bridge from the first bus, then to cause at least one wait state to be inserted on the second bus before transferring the second data element from the buffer to the second bus, wherein the controller causes the second data element to be transferred from the buffer to the second bus, without inserting any wait states, once at least the initial portion of the second packet has been transferred to the bridge.

2. The bridge of claim 1, further comprising a multiplexer controlled by the controller and having an input coupled to the buffer and an output coupled to the second bus.

3. The bridge of claim 1, wherein the controller is coupled to a signal line and the controller causes the at least one wait state to be inserted by providing a signal on the signal line to indicate a wait state.

4. The bridge of claim 3, wherein the first bus is a memory bus, the second bus is a PCI bus, and the signal line is TRDY#.

5. The bridge of claim 1, wherein the first and second packets are cache lines.

6. The bridge of claim 1, wherein the controller causes the second data element to be transferred from the buffer to the second bus, even if at least a portion of the second packet has not been transferred to the bridge, if it is determined that the second packet is not expected.

7. The bridge of claim 1, wherein the controller causes the second data element to be transferred from the buffer to the second bus, even if at least a portion of the second packet has not been transferred to the bridge, once the maximum number of wait states, defined by the maximum latency limit for data transfers allowed by a bus protocol of the second bus, has been reached.

8. A computer comprising:

a memory, coupled to a first bus, to store first and second packets, the first packet comprising first and second data elements;

a master, coupled to a second bus;

a bridge, coupled to both the first bus and the second bus, to store the first and second data elements from the memory, to transfer the first data element to the master, and to insert at least one wait state on the second bus before transferring the second data element to the master if at least an initial portion of the second packet has not been transferred to the bridge from the memory, wherein the bridge transfers the second data element to the master, without inserting any wait states, once at least the initial portion of the second packet has been transferred to the bridge.

9. The computer system of claim 8, wherein the second bus includes a signal line coupled to the bridge and to the master, and the bridge inserts the at least one wait state by deasserting a signal on a signal line to indicate a wait state.

10. The computer system of claim 9, wherein the first bus is a memory bus, the second bus is a PCI bus, and the signal line is TRDY#.

11. The computer system of claim 8, wherein the bridge transfers the second data element to the master, even if at least a portion of the second packet has not been transferred to the bridge, if it is determined that the second packet is not expected.

12. The computer system of claim 8, wherein the bridge transfers the second data element to the master, even if at least a portion of the second packet has not been transferred to the bridge, once the maximum number of wait states, defined by the maximum latency limit for data transfers allowed by a bus protocol of the second bus, has been reached.

13. A method of transferring data from a memory to a master, the method comprising the steps of:

a. transferring a plurality of data elements of a first packet from the memory to a bridge via a first bus;

b. transferring a first data element from the bridge to the master via a second bus;

c. waiting for a period of time before transferring a second data element from the bridge to the master if at least an initial portion of a second packet is not transferred to the bridge from the memory; and d. transferring the second data element from the bridge to the master via the second bus, without inserting any wait states, once at least the initial portion of the second packet has been transferred to the bridge.

14. The method of claim 13, further comprising the steps of:

e. waiting for a period of time before transferring a third data element from the bridge to the master if at least a portion of a second packet is not transferred to the bridge from the memory; and f. transferring the third data element from the bridge to the master via the second bus.

15. The method of claim 13, wherein the second bus is a PCI bus.

16. The method of claim 13, wherein the period of time is less than the maximum latency limit for data transfers allowed by a bus protocol of the second bus.

17. The method of claim 13, wherein the step of waiting for a period of time includes the sub-step of inserting at least one wait state on the second bus.

18. The method of claim 13, wherein the first and second packets are cache lines.

* * * * *